UNITED STATES PATENT OFFICE.

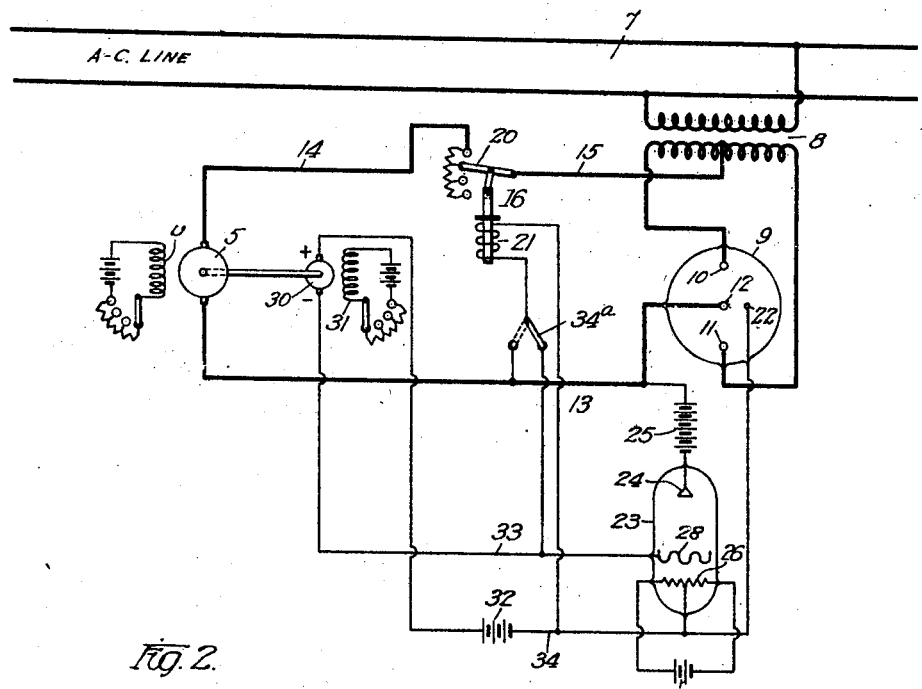
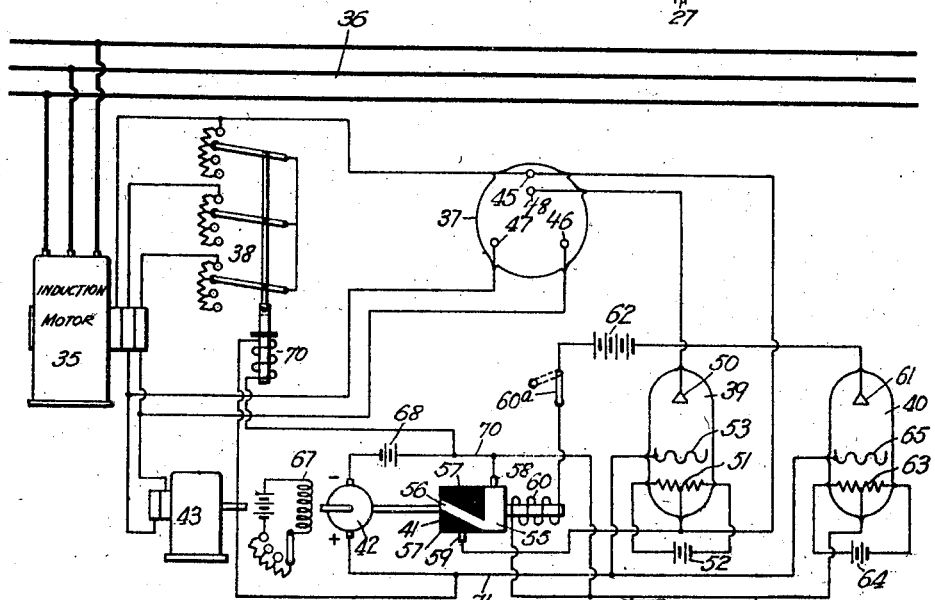

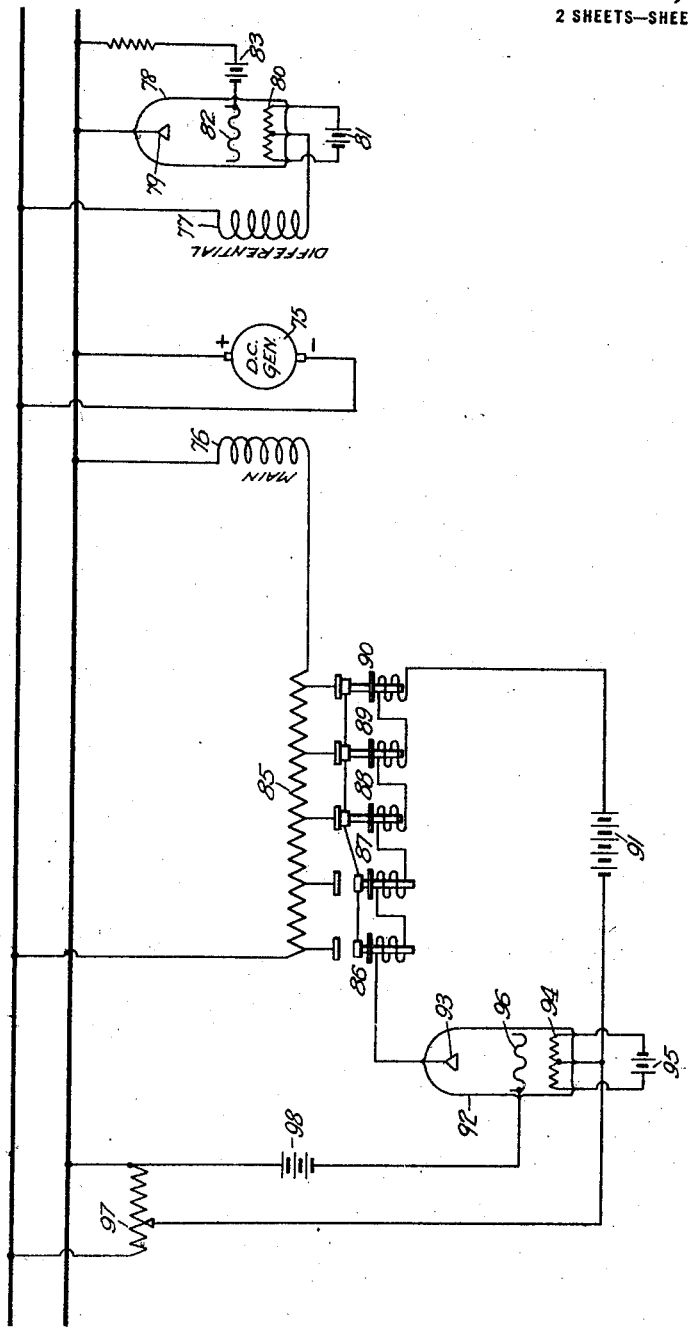

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLING AND REGULATING APPARATUS AND SYSTEM.

1,420,858.  Specification of Letters Patent.  Patented June 27, 1922.

Application filed March 12, 1920. Serial No. 365,190.

*To all whom it may concern:*

Be it known that I, FRIEDRICH WILHELM MEYER, a citizen of Germany, residing at Milwaukee, in the county of Milwaukee and State of Wisconsin, have invented new and useful Improvements in Controlling and Regulating Apparatus and Systems, of which the following is a specification.

This invention relates to controlling and regulating apparatus and systems.

It is particularly applicable to the regulation and control of dynamo electric machines although not limited to such use.

Ordinarily dynamo electric machines heretofore have been regulated and controlled for variations in load, voltage, etc., by employing windings, electromagnetically and manually operated switches and resistances. Such regulation, by itself, because of the mechanical inertia of the moving parts and the self induction of the windings and magnet coils, is unsatisfactorily slow and unstable in many instances.

The regulation and control of dynamo electric machines by means of electroionic valves is extremely sensitive and powerful, and stable operation ordinarily results.

If dynamo electric machines are regulated and controlled by electroionic valves, and if the machines are of high power and subject to violent changes in operating conditions, the electroionic valves may be of considerable size. Also where the variations in operating conditions are prolonged some of the valves in use may not be able to continue their corrective influence alone to the best advantage. This may be due to the size of the valves or to the tendency of some valves of this character to lose their high efficiency under prolonged, continuous and heavy duty.

If the valves are of very large size it may be that the powerful and sudden corrective influences produced through their action will tend to produce undesirable fluctuations in the weaker distribution lines or other sources of power. It may also happen that compensation must be made for sudden greater changes in operating conditions than readily can be handled by such electroionic valves as are readily available.

One of the objects of this invention is to improve the regulation provided, by certain electroionic valves, for violent or prolonged variations in operating conditions.

Another object is to increase the range of regulation beyond that provided by smaller electroionic valves.

Another object is to provide regulative and control influences supplementary to those produced through electroionic action.

Another object is to combine and supplement electroionic regulation with electromechanical regulation.

Another object is to lessen the power input fluctuations which might be produced in some instances by employing only electroionic regulation.

Other objects and advantages will appear from the specification and claims.

Embodiments of the invention as employed with dynamo electric machines are diagrammatically illustrated in the accompanying drawings.

In the drawings:

Figure 1 shows a direct current motor operated from an alternating current line and having combined electroionic and electromechanical regulation of its load current.

Fig. 2 shows an induction motor operated from an alternating current line and having its load current regulated by electroionic and electromechanical regulation of the current in the secondary, and Fig. 3 shows a direct current generator whose voltage is regulated electroionically and electromagnetically.

Figure 1 will first be described:

A direct current motor 5, having an adjustable separately excited field 6, is driven from current received from an alternating current line 7. Current induced from the line by a transformer 8 is rectified into unidirectional pulsations through the action of an electroionic valve 9. Valve 9 may be of the arc discharge type.

Valve 9 has two cathodes 10 and 11 connected respectively to the opposite ends of the secondary winding of transformer 8. There is also a cathode 12 which is connected to one of the motor brushes by a conductor 13. The other brush of the motor is connected to the middle of the secondary winding of transformer 8 by conductors 14 and 15 through the adjustable resistance of an electromagnetically operated rheostat 16.

Rheostat 16 has a plurality of resistance steps and a resistance varying switch arm 20. Arm 20 is operated by a winding 21 connected in the system in a manner to be described hereinafter.

Valve 9 has an auxiliary or ignition electrode 22. The potential between ignition electrode 22 and cathode 12 is controlled by an electroionic valve in the form of an electroionic relay 23.

Relay 23 has an anode 24, connected to conductor 13 through a source of current such as a battery 25. Relay 23 also has a cathode 26 which is heated by current from a battery 27. Cathode 26 is connected to ignition electrode 22. The discharge between cathode 26 and anode 24 and consequently the voltage between ignition electrode 22 and cathode 12 of valve 9 is controlled by an auxiliary anode 28. Anode 28 may take the form of a grid.

The potential of grid 28 is controlled by the speed of motor 5. Rigidly secured to the shaft of the motor, so as to simulate the operation thereof, is a small direct current generator or tachometer 30. Tachmeter 30 has an adjustable separately excited field 31. One brush of the tachometer is connected to grid 28. The other brush of the tachometer is connected to cathode 26 of relay 23 through a battery 32. The voltage of the tachometer and battery 32 oppose each other. Normally the voltage of the battery may predominate slightly.

The current needed to control the action of relay 23 is so small, there being no current at all if negative grid potential control is utilized, that the inductive effect of the tachometer winding may be disregarded entirely. Thus the relay responds coincidently with changes in the speed of the tachometer, and consequently with changes in speed of the motor.

The operating winding 21 of the rheostat 16 may be connected in circuit with the armature of the tachometer 30 and the battery 32 between conductors 33 and 34. The benefit of the amplifying effect of the electroionic relay 23 upon the operating winding 21 may be obtained by moving switch 34ª to its dotted line position thereby connecting the operating winding 21 in the control circuit of the relay.

The operation of the motor is under the regulative influence of both the electromagnetically controlled rheostat 16 and the electroionic discharges in electroionic valves 9 and 23.

If a load is thrown upon the motor its speed decreases. The tachometer, following exactly the operation of the motor, immediately decreases in speed. The voltage of the tachometer therefore decreases slightly and the difference between the battery and tachometer voltages increases slightly. Thus a greater positive potential is instantly impressed on grid 28.

The greater positive potential on grid 28 favors the discharge between cathode 26 and anode 24 and the potential of ignition electrode 22 is immediately raised. This promotes the formation of the arc between anodes 10 or 11 of valve 9, corresponding to the proper half wave of the induced current from the line, and cathode 12. The arc therefore forms earlier in the cycle than it otherwise would and the number of active pulses or waves is increased. In consequence more current flows to the motor and there is a tendency to correct its speed and stabilize its operation. This corrective influence is applied substantially coincidently with the need therefor or, in other words, substantially coincidently with the variation in the operating condition of the motor.

If the increase in load is slight, that is within the range of the regulative influence of the valves, and of comparatively short duration the electroionic compensation for the decrease in motor speed above may be sufficient to instantly bring about substantially normal conditions.

If the change is of longer duration the electromechanical regulator, which is more sluggish in its operation than the electroionic, may come into action and cooperate with the electroionic regulator to bring about stable conditions; that is, the electroionic regulator quickly does the first regulating work which is followed by that of the mechanical regulator to which is then transferred a considerable portion of the burden previously carried by the electroionic regulator, whereby the electroionic regulator is under heavy load for but a short time. If the increase in load is greater than can be compensated for by the electroionic vessels alone, then the electromechanical regulator or rheostat 16 comes into play at a point determined by the characteristics of the electroionic relay and the sensitiveness of the electromechanical regulator. The decrease in motor speed lowers the voltage between the terminals of winding 21 of rheostat 16. The rheostat having its operating winding under the influence of the tachometer armature tends to maintain constant speed. When the voltage is lowered by the action of the increased load on the motor the rheostat therefore removes resistance from the armature circuit to restore normal conditions. Under heavy load changes, when the electromechanical regulator has restored the speed to the range of the valves the electroionic regulator is again ready to act. Thus the speed will be more accurately stabilized.

Such a system thus provides for a greater range of regulation than may be obtained from certain sizes and capacities of electroionic valves and provides closer and quicker regulation and more stable operation than can be obtained from electromechanical regulation alone.

A decrease in the load on the motor has the opposite effect. The electroionic control acts to substantially coincidently decrease the load current and thus decrease the motor speed and restore normal conditions. If the load decrease is within certain limits as to duration of application and amount the electroionic control may suffice. If, however, the decrease in load is for a longer period the electromechanical regulator comes into play, cooperates with the electroionic regulator and takes care of the greater variations and brings the system again within the range of the electroionic regulation. The mechanical regulator, while more sluggish in its operation than the electroionic regulator, relieves the electroionic regulator of its heavy duty as early as possible, and also naturally takes care of changes which the electroionic regulator, on account of its range, cannot take care of.

By so combining electroionic and electromechanical regulation, the size of the devices may be decreased. Closer regulation and more stable operation can be obtained than would be possible with electromechanical regulation alone.

Electroionic valves of large size, because of their violent and powerful corrective tendencies, may cause undesirable disturbances in small power distribution systems. This is because the valves in attempting to make substantially instantaneous corrections for wide variations in operating conditions may cause too great a drain on the system. This difficulty may be obviated to a very great extent by decreasing the size of the valves employed with the supplementary electromechanical control.

Fig. 2 shows an induction motor 35 supplied by a three-phase line 36. The load current of the motor is regulated for variations in load, impressed voltage and other conditions by controlling the secondary current through the action of an electroionic valve 37 and an electromagnetically operated rheostat 38.

Electroionic valve 37 may be of the arc discharge type. The magnitude and number of active pulsations is controlled directly by an electroionic valve such as an electroionic relay 39 and indirectly by an electroionic relay 40 through an adjustable contactor 41 which limits the duration of the pulsations. A direct current tachometer 42 for controlling the grid potentials in relays 39 and 40 is driven by a synchronous motor 43 connected to the secondary of the motor to be regulated to follow the operation thereof, but so that the motor 43 is in synchronism with the cycles of the secondary circuit. The speed of the synchronous motor 43 varies inversely with the speed of the induction motor 35—within certain limits. Motor 43 also drives contactor 41. Of course, it will be understood that the tachometer may be connected directly to the shaft of motor 35, if desired. The speed of the contactor 41 must always be such that it is in synchronism with the cycles of the secondary circuit.

Valve 37 is provided with three electrodes 45, 46 and 47 which act first as anodes and then as cathodes, the arc discharges passing in sequence therebetween. These electrodes are connected to the secondary windings of induction motor 35. An auxiliary or ignition electrode 48 controls the starting of an arc.

Electroionic relay 39 has a main anode 50 and a cathode 51. Cathode 51 is heated by current from a battery 52 and is connected to electrode 45. The main anode 50 of relay 39 is connected to ignition electrode 48 of valve 37.

The discharge in relay 39 is controlled by an auxiliary electrode 53, which may take the form of a grid. The potential on grid 53 is controlled by the voltage of tachometer 42 and the time of application of the potential is controlled by contactor 41.

Contactor 41 is in the form of a drum having a continuous conducting ring 55, provided with a narrow diagonally extending strip 56, and an insulating segment 57. A brush 58 bears continuously upon ring 55 and a brush 59 bears alternately upon insulated segment 57 and conducting strip 56 as the drum is rotated. When brush 59 engages strip 56 the brushes 58 and 59 are momentarily interconnected. The width of the contact strip 56 may be increased to extend the duration of the supporting influence on the arc.

The contactor drum is longitudinally movable along its shaft to vary the time when the brushes are interconnected. The drum may be biased in one direction by a spring or other suitable means. The position of the drum may be controlled by a magnet 60. If desired the adjustment of the longitudinal position of the drum may be effected by hand.

The intensity of the energization of magnet 60 is controlled by electroionic relay 40. Relay 40 has a main anode 61 connected to one terminal of the winding of magnet 60 through a battery 62. A cathode 63 heated by a battery 64 is connected to the other terminal of the winding of magnet 60. An auxiliary electrode or grid 65 controls the discharge in relay 40.

Tachometer 42, which may have an adjustable separately excited field 67, has one of its brushes connected to grids 53 and 65 of relays 39 and 40 respectively. The other brush of the tachometer is connected to brush 58 and cathode 63 of relay 40 through a battery 68. The tachometer and battery 68 oppose each other. The voltage of the battery may normally predominate.

Changes in the speed of motor 35 simultaneously produce corresponding changes in the speed of auxiliary motor 43 which in turn produces corresponding changes in the tachometer voltage. The difference in potential between the tachometer and battery 68 is thus varied with the result that the discharges in both relays 39 and 40 are affected. The discharge in relay 40 controls the energization of magnet 60, and consequently the longitudinal position of the drum of contactor 41. The change in the discharge of relay 40 therefore varies the time of the momentary completion of the circuit from the tachometer and battery 68 to cathode 51 of relay 39. During the momentary completion of this circuit the discharge in relay 39 depends upon the potential on grid 53. Thus the discharge in relay 39 and consequently the potential on ignition electrode 48 of device 37 may be varied, both as to amount and time of application. In this manner the condition of the tachometer controls both the time of application and the magnitude of the changes in the potential impressed on the ignition electrode. The tachometer therefore exerts an influence upon the current flowing in the secondary of motor 35.

When the adjustment of the contactor drum is controlled by hand the switch 60ᵃ may be moved to its dotted line position and the electroionic relay 40 omitted from the system.

The magnitude and number of active pulsations are controlled by the potential regulation for the ignition, so that if desired the electromagnetic control of the contactor need not be used. When the induction motor is operating at low speed, there is a tendency for only a few pulsations to be effective, and for these effective pulsations to be of great magnitude. This results in uneven distribution of the energy supplied to the motor. By properly adjusting the contactor, the time of ignition of the pulsations may be delayed to such an extent as to limit the magnitude of the pulsations. Thus a better distribution of effective pulsations is secured. The contactor serves, when properly adjusted, to determine a favorable average ignition time for the pulsations. The potential regulating influence determines whether a pulsation is to be active and the magnitude of an active pulsation.

If desired the current for each phase of the motor secondary may be regulated by providing similar electroionic relays associated with ignition electrodes for electrodes 46 and 47.

Cooperating with and acting as another auxiliary to the electroionic regulator is the electromagnetically controlled regulation of rheostat 38.

Rheostat 38 has a variable resistance in each phase winding of the motor secondary. The effective values of these resistances are varied by an electromagnet 70 which operates all of the rheostat resistance varying contacts simultaneously. The winding of magnet 70 is connected in circuit with the armature of the tachometer 42 and the battery 68 between conductors 70 and 71. It thus tends to maintain the speed of the induction motor 35 constant by varying the effective resistance of motor secondary under variations in load. However, because of the self induction of its winding and the resistance of its moving parts it is comparatively slow in its response and action.

An increase in the load on the motor decreases the speed thereof and consequently the speed of the tachometer increases. The tachometer voltage increases and the predominance of the voltage of tachometer 42 increases. An increase of positive potential is thus impressed on the grids of relays 39 and 40. The discharge in both relays is thereby favored. The increased discharge in relay 40 increases the magnetization of magnet 60 and the drum of contactor 41 is moved to the right. This advances the time of the interconnection of brushes 58 and 59 and consequently the time of the momentary completion of the circuit from the tachometer to cathode 51. The time of the effectiveness of the increased positive potential on grid 53 is thereby advanced, advancing the time of the increased discharge in relay 39 and consequently advancing the time of the application of the higher ignition voltage to electrode 48. Since the inertia of the drum 41 must be overcome, there is a delay in the shifting of the drum, consequently the higher ignition voltage may be applied before the drum is shifted, and the magnitude and number of active pulsations varied accordingly. This varying of the magnitude and number of active pulsations occurs substantially coincidently with the change in speed or other operating condition. The discharges in device 37 is increased and the rotation of the motor is accelerated. As more current flows in the secondary circuit of motor 35 and more current is taken from the line to compensate for the additional load and to maintain the speed constant.

The electroionic regulator therefore provides corrective influences substantially coincidently with variations in operating conditions, and the electromechanical regulator cooperates with and relieves the electroionic regulator of the heavy duty as soon as possible.

If the load or other variations in operating conditions are within the range of the corrective influences which can be produced through the action of the electroionic devices and are not of too long duration, no further corrective influence may be necessary and extremely close regulation and stable operation of the motor result. If however the load or other variations are more prolonged or pronounced the electromechanical regulator comes into play.

The electromechanical regulator thus co-operates with the electroionic regulator to compensate for prolonged or great variations and returns the system to the range of the electroionic regulator as previously described.

An increase in motor speed brings about a reversal of operation. Then the electroionic valves may act alone to decrease the secondary current and consequently the primary current for slight and short variations in operating conditions. If the variation is prolonged or beyond the range of the valves the electromechanical regulator comes into play to take over a portion of the regulating work and thus facilitate the operation and bring the system within the range of the electroionic regulator.

Fig. 3 shows a direct current generator 75 regulated to maintain substantially constant voltage. The generator has a main shunt field 76 and a differential shunt field 77.

The circuit of the differential field is completed through an electroionic valve 78. Valve 78 has a main anode 79 connected to one side of the line fed by the generator. It also has a cathode 80 connected to the other side of the line through the differential field. Cathode 80 is heated by current from a battery 81. An auxiliary electrode 82, which may take the form of a grid, is connected to the line through a battery 83 and suitable resistance. Battery 83 opposes the line voltage and its voltage may be such that decrease in line voltage increases the negative potential on grid 82.

If load is thrown upon the line or the speed of the generator decreases the generator voltage decreases. This decrease in voltage causes the negative potential on grid 82 to increase and the discharge through valve 78 decreases. The decreased discharge decreases the current through the differential field and thus raises the generator voltage. A decrease in the load on the line produces the opposite effect.

There is thus provided a sensitive regulation of the generator voltage, the corrective effects acting substantially coincidently with the variations in operating conditions necessitating correction.

Cooperating with the pure electroionic regulator comprising an electroionic regulator only is an electromechanical regulator acting directly upon the shunt field of the generator. This regulator has a variable resistance 85 in series with the shunt field. The resistance is varied by a series of electromagnetic switches 86, 87, 88, 89 and 90. All of the switches are biased to open position by springs or other suitable means.

The current for the windings of the switches is obtained from a battery 91 through an electroionic relay 92. The windings of the switches are connected in series. Relay 92 has a main anode 93 connected to one end of the series of switch windings. It also has a cathode 94 connected to the other end of the series of switch windings through battery 91. Cathode 94 is heated by current from a battery 95. The discharge through relay 92 and consequently the current through the switch windings is regulated by an auxiliary anode 96. Anode 96 may be in the form of a grid.

The discharge between cathode 94 and anode 93 is governed by the voltage of the line through the drop in a resistance 97 and a battery 98. Battery 98 opposes the line voltage and the relation is such that an increase in line voltage increases the positive potential on grid 96.

Normally the discharge through relay 92 allows sufficient current from battery 91 to flow through the magnet windings to retain switches 86 and 87 open, the remaining switches being closed. The switches are so adjusted that they respond to different values of current. Thus an increase in the normal discharge through relay 92 causes switches 88, 89 and 90 to open in sequence as the current increases, while a decrease in the normal discharge through relay 92 allows switches 87 and 86 to close in sequence as the current decreases.

When the load on the generator is increased or the speed thereof decreases and its voltage drops the positive potential on grid 96 decreases and the discharge through relay 92 decreases. When negative grid control is employed, a decrease of speed causes the negative potential on the grid to increase, thereby decreasing the discharge through relay 92. This decreases the current through the switch windings and switches 87 and 86 respond in sequence as the current decreases short circuiting more and more of the shunt field resistance. More current consequently flows through the shunt field and the generator voltage is increased.

A decrease in the normal load on the generator or an increase in the speed increases its voltage with a resultant increase in the positive potential on grid 96 and increase in the discharge of relay 92. More current flows through the switch windings and switches 88, 89 and 90 are opened in sequence. The shunt field resistance is thereby increased and the generator voltage is decreased.

Relay 92 responds substantially coincidently with the variations in the operating conditions of the generator the same as device 78. But relay 92 does not act directly upon the field. It controls comparatively sluggish electromechanical switches so that its effect is not so rapid as that of valve 78. However, since it acts merely to control the actual regulating means relay 92 may be made comparatively small. Moreover, it initiates the operation of the rheostat more quickly and varies the current through the rheostat windings to a greater extent than could otherwise be the case if mechanical regulating apparatus alone were employed.

The action and cooperation of the purely electroionic regulator and the electroionically controlled electromechanical regulator is the same as previously described for the other systems. The pure electroionic regulation comes into play to compensate for the lesser and quicker variations in operating conditions. Then the electromechanical regulation comes into play to help compensate for the longer variations, and, if these variations are great, to bring the system again within the control of the electroionic regulator.

It will be understood that instead of the moving contact drum shown in Fig. 2 other kinds of contacts controlled either electromagnetically or by hand may be employed in the sensitive circuits with the same advantages, such for example as avoiding the use of contacts carrying currents of considerable magnitude in the control circuits of the electroionic relays.

What is claimed is:

1. A regulator for machines subject to varying load and power conditions, having electroionic regulating means under the influence of the varying conditions and acting to regulate the machine, and electromechanical means also under the influence of the varying conditions and acting upon the machine in cooperation with the electroionic means to regulate and stabilize the operation of the machine.

2. A regulator system for dynamo electric machines subject to varying load and power conditions, having electroionic regulating means under the influence of the varying conditions between certain limits of variation and acting to regulate the machine, and electromechanical means acting as an auxiliary to said electroionic means beyond the range thereof to bring the effect of the variations within the range of operation of the electroionic means.

3. A regulator for dynamo electric machines subject to varying load and power conditions, comprising an electroionic valve directly responsive to the varying conditions and directly and coincidently acting upon the machine to regulate the same within certain limits of variation, and an electromechanical regulator also subject to the varying conditions and cooperating with said valve and acting supplementary thereto upon the machine to regulate the same within wider limits and bring the effect of the variations within the range of said valve.

4. A regulating system having a dynamo electric machine subject to varying load and power conditions, an electroionic valve coincidently responsive to the varying conditions and acting directly upon said machine to regulate the same for variations in conditions within a certain range, and an electromagnetic regulator also subject to the varying conditions and cooperating with said valve to act upon said machine to regulate the same for variations in conditions initially without the range of said valve and to bring the effect of the variations within the range of said valve.

5. A regulating system having a dynamo electric machine subject to varying load and power conditions, an electromechanical regulator responsive to the varying conditions and acting upon said machine to regulate the same, and an electroionic valve coincidently responsive to the varying conditions and acting directly on said machine in cooperation with said electromechanical regulator whereby said machine is closely regulated for variations of greater magnitude and longer duration than can be compensated for by the valve acting alone.

In witness whereof, I have hereunto subscribed my name.

FRIEDRICH WILHELM MEYER.